(12) United States Patent
Jasper (10) Patent No.: US 10,383,281 B2
(45) Date of Patent: Aug. 20, 2019

(54) TUBULAR BAT SHAPE WITH LONGITUDINAL KEY, FOR USE WITH THE PICK-UP REEL OF A HARVESTER

(71) Applicant: HCC, INC., Mendota, IL (US)

(72) Inventor: Edward Patrick Jasper, Mendota, IL (US)

(73) Assignee: HCC, Inc., Mendota, IL (US)

(*) Notice: Subject to any disclaimer, the term of this patent is extended or adjusted under 35 U.S.C. 154(b) by 163 days.

(21) Appl. No.: 15/014,530

(22) Filed: Feb. 3, 2016

(65) Prior Publication Data
US 2016/0249532 A1 Sep. 1, 2016

Related U.S. Application Data

(60) Provisional application No. 62/121,922, filed on Feb. 27, 2015.

(51) Int. Cl.
*A01D 80/02* (2006.01)
*A01D 57/02* (2006.01)

(52) U.S. Cl.
CPC .............. *A01D 57/02* (2013.01); *A01D 80/02* (2013.01)

(58) Field of Classification Search
CPC ... A01D 9/04; A01D 7/06; A01D 7/08; A01D 57/02; A01D 57/03; A01D 2101/00; A01D 80/02; A01D 78/02
See application file for complete search history.

(56) References Cited

U.S. PATENT DOCUMENTS

| 2,133,010 | A | * | 10/1938 | Barry | B62K 21/16 74/551.1 |
| 3,066,470 | A | * | 12/1962 | Johnston | A01D 80/02 56/400 |
| 3,148,494 | A | | 9/1964 | Scheidenhelm | |
| 3,468,109 | A | | 9/1969 | Reimer | |
| 3,863,521 | A | * | 2/1975 | Gatsos | B62K 21/16 280/278 |
| 4,043,688 | A | * | 8/1977 | Humlong | B62K 21/22 403/191 |
| 4,622,840 | A | | 11/1986 | Diffenderfer et al. | |

(Continued)

FOREIGN PATENT DOCUMENTS

GB 1264615 2/1972

*Primary Examiner* — Robert E Pezzuto
*Assistant Examiner* — Adam J Behrens
(74) *Attorney, Agent, or Firm* — Clark Hill PLC; James R. Foley (57) ABSTRACT

A bat tube for use with a harvester pick-up reel. The bat tube is configured to resist torsional loads, without having to use fasteners that engage holes in the bat tube. Preferably, the external surface of the bat tube provides at least one key or keyway that engages a corresponding keyway or key in the band or strap portion of the tines. As such, once a tine is engaged with the bat tube, the tine is generally prevented from rotating about the bat tube. Additionally, by not using fasteners to engage holes in the bat tube, spacing between the tines can be varied. The bat tube allows for tine fastening and torsional resistance without drilling or punching holes, which allows for easily variable tine spacings. It also allows for improved crop gathering and crop entry characteristics over a typical round profile.

20 Claims, 6 Drawing Sheets

(56) References Cited

U.S. PATENT DOCUMENTS

| | | | |
|---|---|---|---|
| 4,706,448 A * | 11/1987 | Gessel | A01D 57/02 56/400 |
| 4,776,155 A * | 10/1988 | Fox | A01D 57/02 29/455.1 |
| 4,882,899 A * | 11/1989 | Jasper | A01D 57/02 56/220 |
| 4,901,511 A | 2/1990 | Yarmashev et al. | |
| 5,235,734 A * | 8/1993 | Durocher | B62D 1/185 280/777 |
| 5,271,213 A | 12/1993 | von Allwoerdan | |
| 5,595,052 A | 1/1997 | Jasper et al. | |
| 5,595,053 A | 1/1997 | Jasper et al. | |
| 6,199,358 B1 * | 3/2001 | Majkrzak | A01D 57/02 56/220 |
| 6,324,823 B1 | 12/2001 | Remillard | |
| 6,397,573 B2 * | 6/2002 | Majkrzak | A01D 57/02 56/220 |
| 6,910,323 B2 * | 6/2005 | Bickel | A01D 57/02 56/220 |
| 7,124,564 B2 | 10/2006 | Glazik et al. | |
| 7,165,385 B2 | 1/2007 | Lanzinger et al. | |
| 7,665,287 B2 | 2/2010 | Jones | |
| 7,856,801 B2 | 12/2010 | Remillard | |
| 3,028,505 A1 | 10/2011 | Roberge | |
| 8,205,899 B2 | 6/2012 | Mackin et al. | |
| 2003/0110752 A1 | 6/2003 | Dow | |
| 2005/0274100 A1 * | 12/2005 | Lanzinger | A01D 57/02 56/220 |
| 2014/0223876 A1 * | 8/2014 | Honey | A01D 57/12 56/220 |
| 2014/0260171 A1 * | 9/2014 | McGehee | A01D 80/02 56/400 |
| 2014/0283494 A1 * | 9/2014 | Schrattenecker | A01D 57/02 56/249 |
| 2015/0089916 A1 * | 4/2015 | Schroeder | A01D 57/02 56/220 |
| 2015/0096279 A1 * | 4/2015 | Herringshaw | A01D 80/02 56/220 |

* cited by examiner

TUBULAR BAT SHAPE WITH LONGITUDINAL KEY, FOR USE WITH THE PICK-UP REEL OF A HARVESTER

RELATED APPLICATION (PRIORITY CLAIM)

This application claims the benefit of U.S. Provisional Application Ser. No. 62/121,922, filed Feb. 27, 2015, which is hereby incorporated herein by reference in its entirety.

BACKGROUND

The present invention generally relates to harvester pick up reels, and more specifically relates to a tubular bat shape which provides for the resistance of torsional loads as well as provides that tines can be readily repositioned thereon, without having to use fasteners which engage in holes which have been punched or drilled in the tube.

A typical harvester includes a pick-up reel. The pick-up reel includes a plurality of bat tubes, and tines are arranged along each of the bat tubes. When the harvester operates, the pick-up reel rotates, causing the tines to engage the crop and pull the crop into the harvester.

A typical bat tube of a harvester pick-up reel has a round, tubular profile (i.e., with regard to its exterior surface, the bat tube is circular in cross-section). As such, holes need to be punched or drilled into the tube as a means to fasten tines to the tube and resist torsional loading. After holes are punched or drilled into the bat tube, the tines are secured to the bat tube using fasteners, where the fasteners engage the holes which have been punched or drilled into the bat tube. Once the holes have been punched or drilled into the bat tube, the locations of the holes are fixed. Because the locations of the holes are fixed after the bat tube has been processed, the locations of the tines are effectively pre-determined, and the space between the tines cannot be varied.

In order to reduce the space between tines, additional holes would need to be punched or drilled into the bat tube. On the other hand, in order to increase the space between tines, holes would need to be skipped when installing the tines on the bat tube. With regard to punching or drilling the holes in a bat tube, a typical bat tube is a long, single piece, thereby making the tube difficult to process. Additionally, as a result of being a single, long tube, a typical bat tube requires a multiple piece, wrap-around type bearing design, given that the bat tube is provided as being a single, long tube. Finally, given that the bat tube is provided as being a single, long tube, if the bat tube is damaged or otherwise needs to be serviced, the entire bat tube needs to be removed from the reel or otherwise dealt with in order to effect the service. If a new bat tube needs to be ordered and delivered, this is not beneficial given that a bat tube can be as much as forty feet long.

SUMMARY

An object of an embodiment of the present invention is to provide a tubular bat shape for use with a harvester pick-up reel, where the bat tube resists torsional loads.

Another object of an embodiment of the present invention is to provide a tubular bat shape for use with a harvester pick-up reel, where the bat tube is configured to provide for variance in tine spacing along the bat tube without the bat tube having to be re-processed or otherwise altered.

Still another object of an embodiment of the present invention is to provide a tubular bat shape for use with a harvester pick-up reel, where the bat tube is provided in multiple sections, thereby providing improved serviceability.

Briefly, an embodiment of the present invention provides a bat tube for use with a harvester pick-up reel, where the bat tube is configured to resist torsional loads, without having to use fasteners that engage holes in the bat tube. Preferably, the external surface of the bat tube provides that the bat tube is non-circular in cross-section, thereby providing that once a tine is engaged with the bat tube, the tine is generally prevented from rotating about the bat tube. More specifically, the bat tube may be provided with a key, such as a longitudinal key, which engages a corresponding keyway provided in a band or strap portion of a tine. The engagement of the key with the keyway provides that the tines are prevented from rotating about the external surface of the bat tube, but can be readily repositioned along the length of the bat tube. By not using fasteners to engage holes in the bat tube, spacing between the tines can be varied, and varied quite easily, merely by loosening the band or strap portions of the tines, sliding the tines along the bat tube, and re-tightening the band or strap portions of the tines.

Specifically, the shape of the bat tube may be provided such that the bat tube is pinched in one or more locations, such as in two locations generally one hundred eighty degrees apart from each other along a circumference of an external surface of the bat tube. Preferably, an internal surface of a band or strap portion of each of the tines corresponds with the shape of the outer surface of the bat tube, thereby providing that the tines are effectively keyed to the bat tube when installed, keyed such that the tines cannot readily rotate about the bat tube, but when the band or strap portions of the tines are loosened, the tines can be re-positioned on the bat tube, by sliding them along the length of the bat tube. Once the tines are in the desired location relative to the bat tube, the band or strap portions of the tines can be tightened.

While the band or strap portions of the tines may be configured to be tightened to the bat tube with fasteners, the fasteners do not engage the bat tube in holes formed in the bat tube, but rather the fasteners function to tighten or loosen the band or strap portion of the tine around the bat tube. To adjust the location of a tine on the bat tube, the fastener in the band or strap portion of the tine is loosened, the tine is slid along the bat tube to its newly desired location, and then fastener in the band or strap portion of the tine is re-tightened.

The bat tube may be installed relative to a pick-up reel such that, for example, one of the pinched areas on the bat tube points generally down, thereby providing increased bat tube area in the crop gathering direction for improved material handling and favorable crop entry profile. Another pinched area may be provided as pointing generally up. That being said, the pinched areas of the bat tube may be provided in different locations other than one facing up and one facing down. Alternatively, the bat tube may not be pinched at all, depending on the specific embodiment of the present invention, but may merely provide a shape which effectively achieves the same function.

A tubular bat shape in accordance with an embodiment of the present invention may be provided as being part of a multiple component system. Specifically, the system may include an inner profile and an outer profile. Each of the profiles may be provided as being a plurality of bat tube sections, wherein at least some of the bat tube sections which comprise the inner profile are engaged with one or more bearings, and each of the bat tube sections which comprise the outer profile is engaged with at least one bat tube section which comprises the inner profile. Preferably, the bat tube surface which the band or strap portions of the tines provides a key, such as a longitudinal key, and a corresponding keyway is provided in the band or strap portion of the tines. Preferably, the key/keyway engagement provides that the band or strap portions of the tines are generally prevented from rotating about the circumference of the outer surface of the bat tube, as well as provides that the tines can be readily re-positioned along the length of the bat tube. Additionally, the fact that each of the profiles are provided as being a plurality of bat tube sections rather than a single, long tube, makes the entire design much more serviceable.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION OF ILLUSTRATED EMBODIMENTS

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

An embodiment of the present invention provides a tubular bat shape for use with a harvester pick-up reel, where the tubular bat shape is configured to resist torsional loads as well as provide for variance in tine spacing along the bat tube.

First, a conventional harvester which includes bat tubes will be generally described, and then a tubular bat shape (and a preferred bat tube system), which is in accordance with an embodiment of the present invention will be described.

Figure 1:
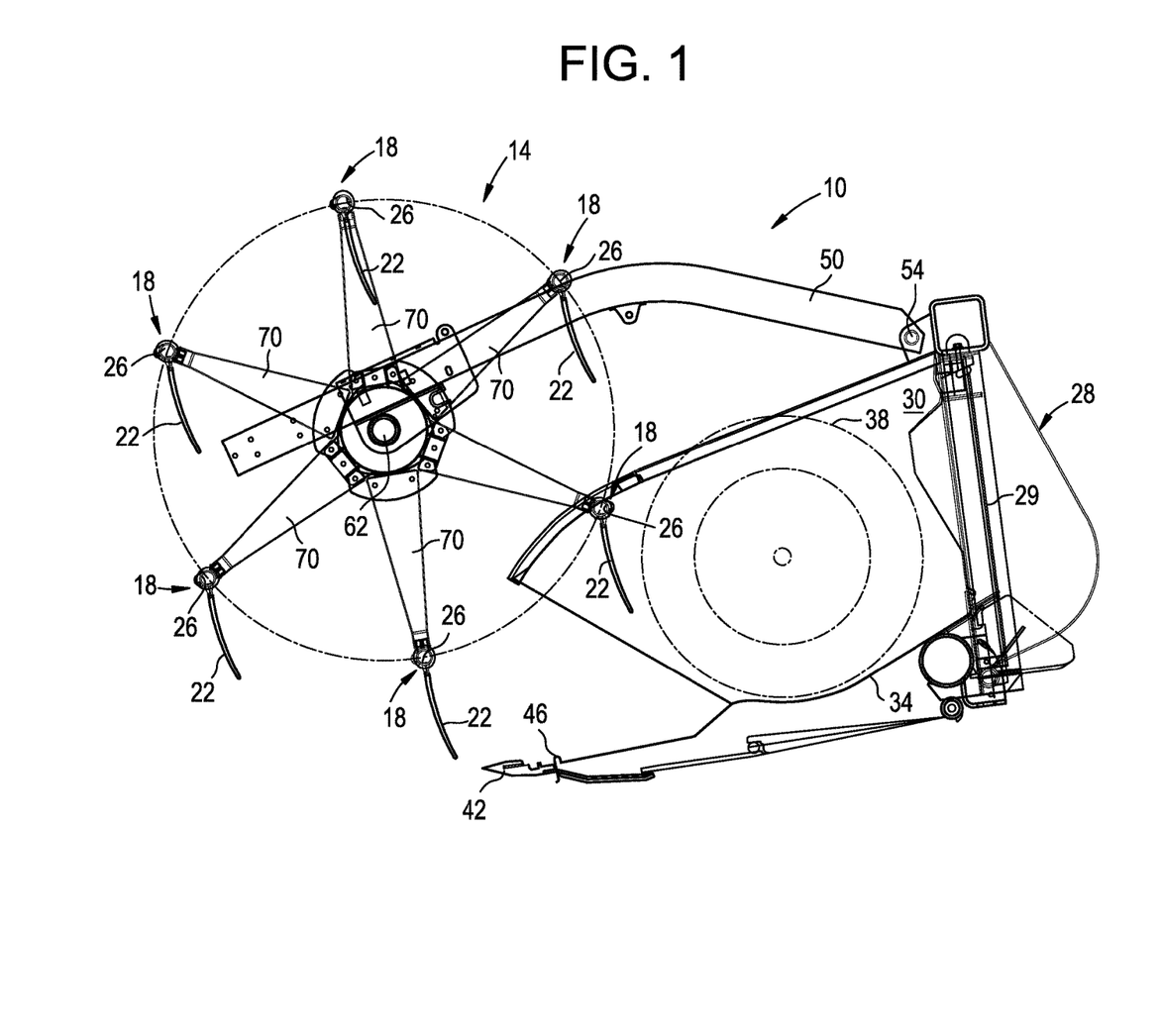
FIG. 1 is a side view of a conventional harvester header, which comprises a pick-up reel that utilizes bat tubes.

FIG. 1 is a side view of a conventional harvester header 10 utilizing a pick-up reel 14. The harvester header 10 shown in FIG. 1 includes a non-flip reel, i.e., a pick-up reel 14 that provides for standard tine action (i.e., that the tines 22 do not flip during harvesting), but embodiments of the present invention can be utilized with flip-type reels as well.

The harvester header 10 includes the pick-up reel 14, and a harvester tine and bat tube assembly 18. The assembly 18 includes harvester tines 22 and bat tubes 26. The harvester header 10 also includes a harvester platform 28 including a platform frame 29, supported for movement over ground, and side and rear wall 30. A floor 34 extends between the opposite side walls 30, and a transverse crop converging auger 38 is rotatably supported above the floor 34 and forward of the rear wall 30 (unless the harvester is provided as being a draper header type of harvester, in which case cross belts would be utilized instead of an auger). A transverse cutter bar 42 is mounted along the forward edge of the floor 34, and an upright crop dam 46 is supported between the cutter bar 42 and the floor 34.

The pick-up reel 14 generally spans the width of the platform 28, forward of the auger 38 and above the cutter bar 42. The pick-up reel 14 is connected to the platform 28 by a pair of reel support arms 50 (one shown), which support the pick-up reel 14 on the frame 29. In the construction illustrated in FIG. 1, the support arms 50 are pivotally connected to the frame 29 at pivot points 54. The support arms 50 are generally above the sidewalls 30 of the platform 28. Preferably, the support arms 50 are selectively vertically adjustable by a pair of cylinders (not shown) connected between the support arms 50 and the sidewalls 30.

A movable support structure 58 is supported at the forward end of each support arm 50. The support structures 58 are generally slidable between forward and rearward positions on the support arm 50, and their movement is controlled by a pair of cylinders (not shown). The support arms 50 and the support structures 58 are adjustably positioned to adjust the position of the pick-up reel 14 relative to the platform 28.

A tubular reel shaft or first shaft 62 is journalled by and extends between the support structures 58. The first shaft 62 is rotatable relative to the support structures 58 about its axis, and a plurality of arms 70 (six in the illustrated construction) radially extend from the shaft 62.

Bat tubes 26 are journalled in the outer ends of the arms 70. The bat tubes 26 are rotatable with the associated arms 70 and, in the illustrated construction, are rotatable relative to the associated arms 70. The bat tubes 26 span the width of the pick-up reel 14 and are generally parallel to and radially-spaced from the first shaft 62. A plurality of harvester tines 22 are connected to each bat tube 26 for movement with the bat tube 26 (in the illustrated construction, for rotation relative to the first shaft 62 and relative to the associated arms 70).

The above description regarding FIG. 1 was merely provided to explain one possible environment in which the present invention may exist, and should not be considered to be limiting in any way, as the present invention can be employed with pick-up reels and harvesters that are very different from that which is illustrated in FIG. 1.

A typical bat tube (such as part 26 in FIG. 1) has a round tubular profile (i.e., it is circular in cross-section). As such, holes need to be punched or drilled into the bat tube as a means to fasten the tines (part 22 in FIG. 1) to the bat tube and resist torsional loading. Once the holes are formed in the bat tube, the distance between the holes become fixed. Therefore, the potential locations of installed tines is effectively pre-determined depending on the locations of the holes, and the locations of the tines and the space between tines, along the length of the bat tube, cannot be varied easily.

Figure 2:
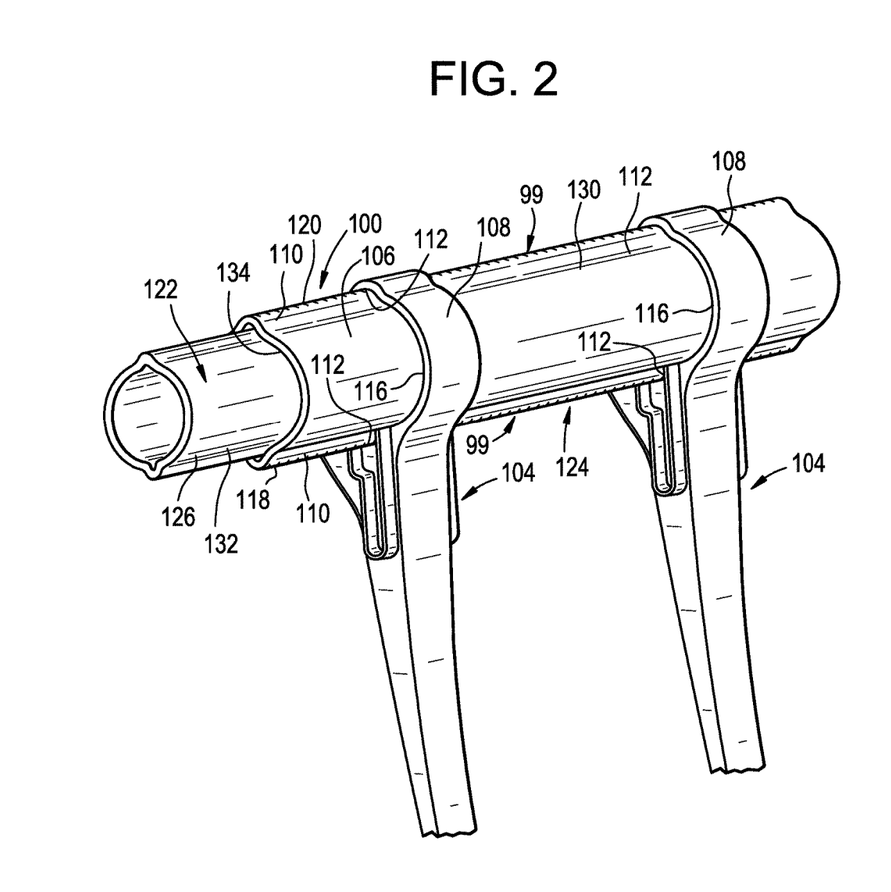
FIG. 2 illustrates a tubular bat shape which is in accordance with an embodiment of the present invention, and which can be used in connection with a pick-up reel of a conventional harvester, such as the harvester shown in FIG. 1.
Figure 3:
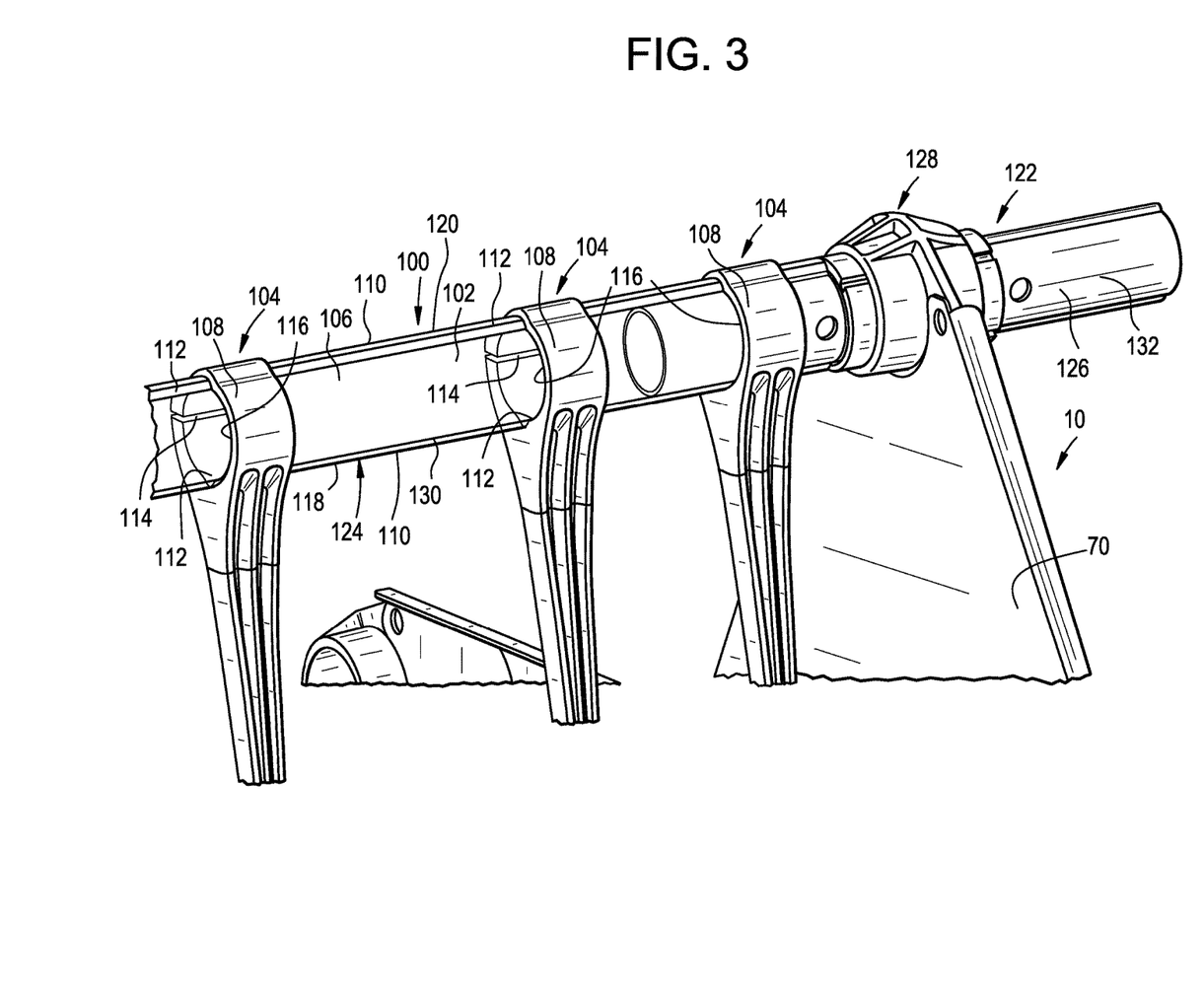
FIG. 3 is similar to FIG. 2, but shows another section of the system in which the tubular bat shape is employed.

FIGS. 2 and 3 illustrate a tubular bat shape 100 which is in accordance with an embodiment of the present invention. The tubular bat shape 100 is configured to resist torsional loads, without having to use fasteners to engage holes which have been formed previously in the bat tube 102. Additionally, the tubular bat shape 100 provides that tines 104 can be readily re-positioned along the length of the bat tube 102, thereby providing easy variance with regard to spacing between the tines 104.

While FIGS. 2 and 3 show a preferred embodiment bat tube system where the system comprises multiple profiles (i.e., a tube-in-a-tube configuration), it should be understood that a tubular bat shape in accordance with the present invention can take many other forms, and can be utilized in systems which are different from that which is shown in FIGS. 2 and 3. Regardless, FIGS. 2 and 3 will now be described in detail.

Figure 4:
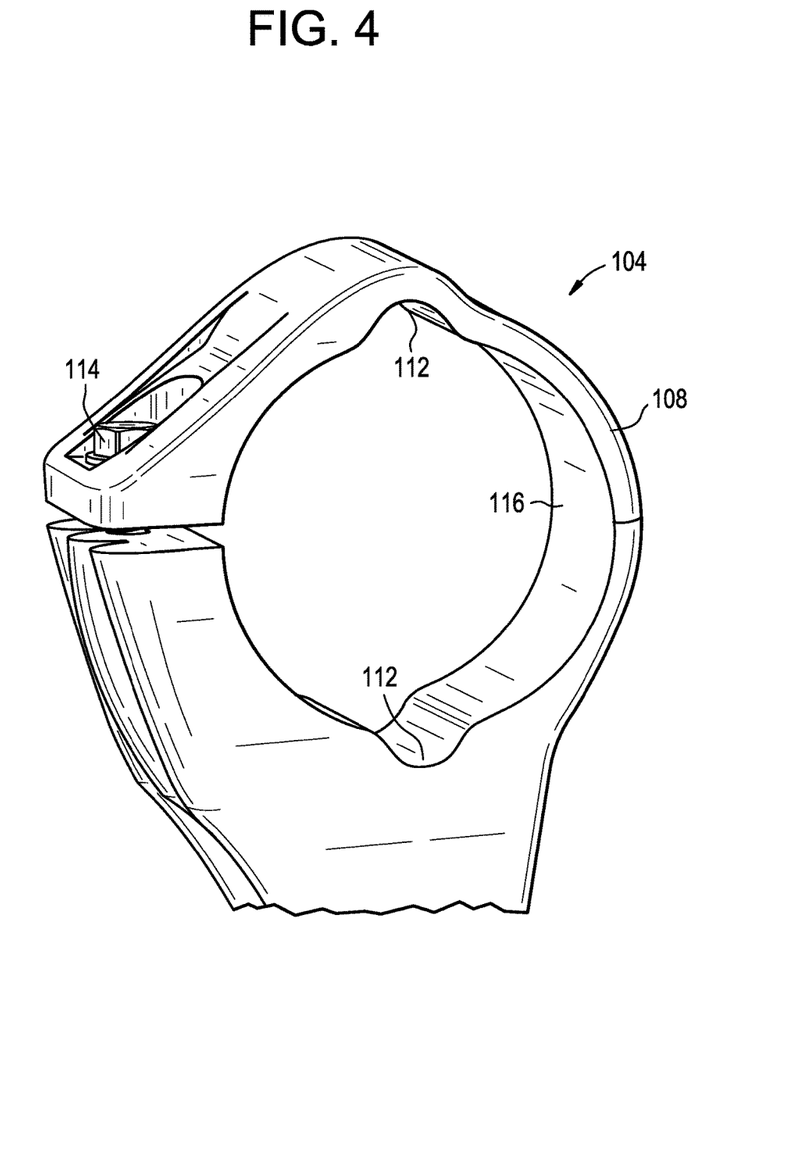
FIG. 4 provides a perspective view of a band or strap portion of the tines shown in FIGS. 2 and 3.
Figure 5:
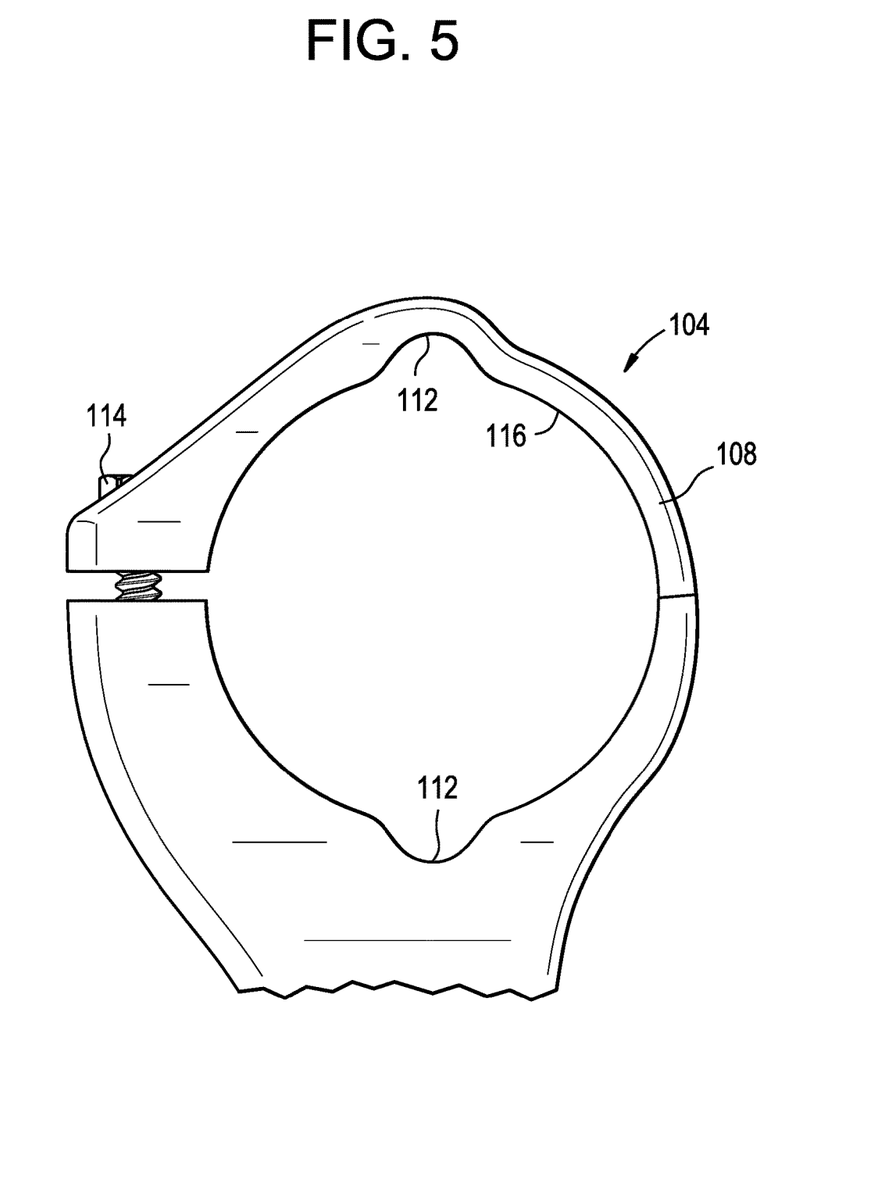
FIG. 5 is similar to FIG. 4, but provides a side view of the band or strap portion of the tines.

FIGS. 2 and 3 illustrate a bat tube and tine system, where the external surface 106 of the bat tube 102 with which the band or strap portions 108 of the tines 104 is provided as being non-circular in cross-section. The external surface 102 provides one or more keys 110, such as two longitudinal keys along the length of the bat tube 102, which engage one or more corresponding keyways 112 provided in the band or strap portion 108 of each of the tines 104. This key/key way engagement provides that the bat tube 102 resists torsional loads without the tines 104 having to be secured to the bat tube 102 using fasteners that engage holes formed in the bat tube 102. Additionally, the engagement provides that the tines 104 can be readily positioned at any desired location along the length of the bat tube 102, and that their positions can be easily adjusted, thereby changing the distance between the tines 104. Specifically, a fastener 114 (most easily seen in FIGS. 4 and 5) provided in the band or strap portions 108 of the tines 104 may be loosened, the tines 104 slid along the bat tube 102 to their desired locations, and the fasteners 114 in the band or strap portions 108 of the tines can be re-tightened onto the bat tube 102.

As shown in FIG. 2, preferably a knurl 99 or other appropriate structure is provided on the bat tube 102, such as on the keys 110, for effectively digging into the band or strap portions 108 of the tines 104, thereby preventing axial migration. The knurl 99 is represented using a few lines in FIG. 2. Preferably, the knurl 99 extends substantially the entire length of the bat tube 102.

As shown in FIGS. 2 and 3, the bat tube 102 may be pinched in one or more locations to provide the keys 110, such as in two locations generally one hundred eighty degrees away from each other, thereby providing V-shaped features. An internal surface 116 (most easily seen in FIGS. 4 and 5) of a band or strap portion 108 of each of the tines 104 preferably corresponds with a shape of the outer surface 106 of the bat tube 102, thereby providing that the tines 104 are effectively keyed to the bat tube 102 such that the tines 104 cannot readily rotate about the bat tube 102, but can be slid along the length of the bat tube 102, when the bands or strap portions 108 are loosened, to vary the distance between the tines 104. While the tines 104 may be configured to be tightened to the bat tube 102 with a fastener 114 (see FIGS. 4 and 5), preferably the fastener 114 does not engage holes formed in the bat tube 102, but rather just tightens and secures the band or strap portion 108 of the tine 104 around the bat tube 102.

As shown in FIGS. 2 and 3, the bat tube 102 may be installed relative to a pick-up reel such that, for example, one 118 of the keys 110 or pinched areas points down, thereby providing increased bat tube area in the crop gathering direction for improved material handling and favorable crop entry profile. As shown, the other key 120 or pinched area may be provided as pointing up. Alternatively, the bat tube 102 may not be pinched at all, but may instead provide a cross-sectional shape that provides a key or keyway that provides effectively the same function—i.e., that tines 104 are generally prevented from rotating about the bat tube 102, but the location of the tines 104 can be adjusted along the length of the bat tube 102, thereby varying the space between the tines 104.

As shown in FIGS. 2 and 3, the bat tube 102 may be part of a multiple component system, wherein there is provided a plurality of profiles, such as an inner profile 122 and an outer profile 124. As shown, each of the profiles 122, 124 may be provided as being a plurality of bat tube sections, wherein at least some of the bat tube sections 126 which comprise the inner profile 122 are engaged with one or more bearings 128 (each of which may be provided as being a simple one-piece bearing), and each of the bat tube sections 130 which comprise the outer profile 124 is engaged with at least one bat tube section 126 which comprises the inner profile 122. Preferably, the exterior surface 132 of each of the bat tube sections 126 which comprise the inner profile 122 corresponds to the interior surface 134 of each of the bat tube sections 130 which comprise the outer profile 124, such that the bat tube sections 126 which comprise the inner profile 122 can slide into the bat tube sections 130 which comprise the outer profile 124. The bat tube sections 130 which comprise the outer profile 124 may or may not be fastened to the bat tube sections 126 which comprise the inner profile 122. Regardless, preferably the exterior surface 106 of each of the bat tube sections 130 which comprise the outer profile 124 corresponds to the interior surface 116 (most easily seen in FIGS. 4 and 5) of the band or strap portion 108 of each of the tines 104, such that the band or strap portions 108 of the tines 104 can be slid onto the bat tube sections 130 which comprise the outer profile 124, and can be tightened onto this exterior surface 106.

Regardless of the exact configuration of the bat tube system, preferably its outer surface 106 provides at least one key 110, such as a pair of longitudinal keys such as pinched sections, and at least one corresponding keyway 112 (see also FIGS. 4 and 5) is provided in the band or strap portion 108 of the tines 104. Preferably, the key/keyway engagement provides that the band or strap portions 108 of the tines 104 are generally prevented from rotating about the circumference of the outer surface 106 of the bat tube 102, as well as provides that the tines 104 can be readily re-positioned along the length of the bat tube 102. Additionally, the fact that each of the profiles 122, 124 are provided as being a plurality of bat tube sections rather than a single, long tube, makes the entire design much more serviceable.

As described, one specific embodiment of the present invention provides a tubular-shaped pick-up reel bat section that has pinched, V-shaped features that are oriented in the vertical position. The V-shaped features are engaged by bat tines, and allows the tines to resist the torsional loads induced by crop gathering. The absence of a set punched or drilled hole pattern for connecting the tines allows for easily variable tine spacing. The vertical profile provides increased bat tube area for crop gathering and favorable crop entry. An inner profile is preferably used with an outer profile to lock bat tube sections together yet allowing them to be easily serviced and allowing for a simplified reel bearing design. An alternative (of which there are many) would be that the V-shaped features would be of alternate form, such as rectangular. Also, the orientation of the V-shaped features may be provided as being slightly off vertical, or even horizontal. Many variations are entirely possible while staying within the scope of the present invention.

The disclosed invention preferably allows for tine fastening and torsional resistance without drilling or punching holes, which allows for easily variable tine spacings. It also allows for improved crop gathering and crop entry characteristics over a round profile. Typical pick-up reel designs use a long, one-piece bat section, which is difficult to process and requires a wrap-around bearing design. Having an internal and external locking profile, the disclosed invention allows for multiple sections without special processing and a simplified bearing design due to the sections being easily serviced.

Figure 6A:
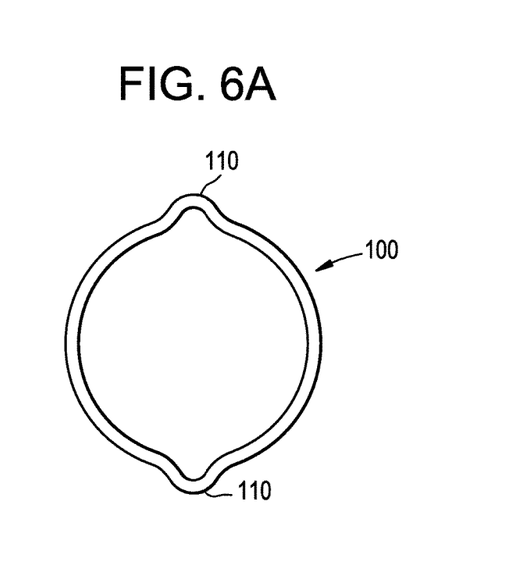
FIGS. 6A, 6B and 6C provide cross-sectional views of different tubular bat shape embodiments of the present invention.
Figure 6B:
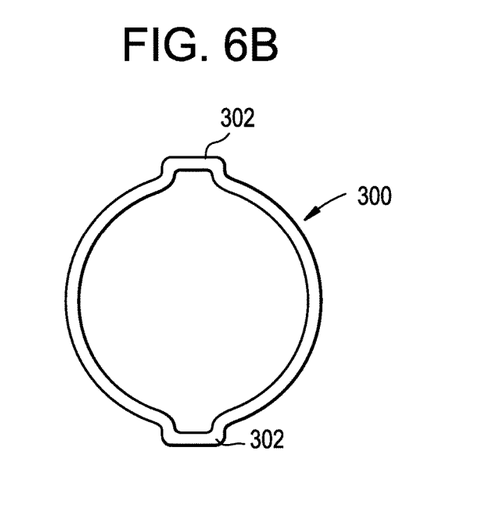
Figure 6C:
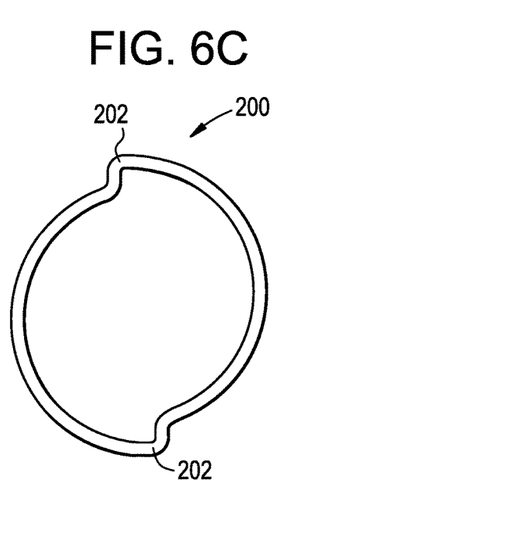

A specific tubular bat shape 100 is illustrated in FIGS. 2 and 3, and has been described in detail. This particular shape 100 is also illustrated in FIG. 6. FIG. 6 also illustrates a couple of alternate shapes 200, 300. Of course, other variations are entirely possible. Regardless of the exact shape or configuration of the bat tube(s), preferably the exterior surface of the bat tube with which the band or strap portions of the tines engage provides at least one key or keyway, such as a pair of longitudinal keys along the length of the bat tube in the form of pinched sections 202, 302, which engages at least one corresponding keyway or key provided in the band or strap portions of the tines which are installed on the bat tube.

While specific embodiments of the invention have been shown and described, it is envisioned that those skilled in the art may devise various modifications without departing from the spirit and scope of the present invention.

What is claimed is:

1. A harvester pick-up reel comprising: a plurality of tines, each having a band portion and a corresponding keyway or key in the band portion; a bat tube configured for engagement with each of the band portions of the plurality of tines, said bat tube comprising an external surface, at least one key or keyway on the external surface of the bat tube which extends along a length of the bat tube and which is configured to engage the corresponding keyway or key in the band portion of each of the plurality of tines; a fastener on the band portion of each of the tines configured to tighten the band portion around the bat tube without the fastener engaging the bat tube, wherein once the band portion of each of the plurality of tines is engaged with the external surface of the bat tube and the fastener is tightened, the fastener and the at least one key or keyway on the external surface of the bat tube prevent each of the plurality of tines from rotating about the bat tube but provides, once the fastener is removed or loosened, that each of the plurality of tines is selectively slidable on the bat tube while the tines are engaged with the bat tube, wherein the plurality of tines are engaged with the at least one key or key way on the external surface of the bat tube, wherein the keyway or key in the band portion of each tine and the at least one key or key way on the external surface of the bat tube are configured such that the keyway or key in the band portion of each tine remains engaged with the at least one key or key way on the external surface of the bat tube when the tines are loosened and selectively slid along the at least one key or key way on the external surface of the bat tube.

2. A harvester pick-up reel as recited in claim 1, wherein the external surface of the bat tube provides at least one key, wherein the at least one key has a knurl thereon for digging into the band portion of the tine.

3. A harvester pick-up reel as recited in claim 1, wherein the external surface of the bat tube provides a plurality of keys or keyways.

4. A harvester pick-up reel as recited in claim 3, wherein said plurality of keys or keyways extend along a length of the bat tube.

5. A harvester pick-up reel as recited in claim 2, wherein each of said at least one key comprises a pinched portion.

6. A harvester pick-up reel as recited in claim 3, wherein each of said plurality of keys or keyways comprises a pinched portion.

7. A harvester pick-up reel as recited in claim 1, wherein the external surface of the bat tube provides a first key or keyway and a second key or keyway, wherein the first key or keyway is one hundred eighty degrees away from the second key or keyway on the bat tube.

8. A harvester pick-up reel as recited in claim 1, wherein the bat tube comprises a multiple component system comprising a plurality of profiles.

9. A harvester pick-up reel as recited in claim 8, wherein the plurality of profiles comprises an inner profile and an outer profile, wherein each of the profiles comprises a plurality of bat tube sections, wherein at least some of the bat tube sections which comprise the inner profile are engaged with one or more bearings, and each of the bat tube sections which comprise the outer profile is engaged with at least one bat tube section which comprises the inner profile, wherein an exterior surface of each of the bat tube sections which comprise the inner profile corresponds to an interior surface of each of the bat tube sections which comprise the outer profile, wherein the bat tube sections which comprise the inner profile are slidable into the bat tube sections which comprise the outer profile.

10. A bat tube and tine configuration for use with a harvester pick-up reel comprising: said tine comprising a band portion, said bat tube comprising an external surface, at least one key or keyway on the external surface of the bat tube configured to engage a corresponding keyway or key in the band portion of the tine, a fastener on the band portion of the tine configured to tighten the band portion around the bat tube without the fastener engaging the bat tube, wherein once the band portion of the tine is engaged with the external surface of the bat tube and the fastener is tightened, the tine is prevented from rotating about the bat tube but, upon the fastener being loosened or removed, the tine is selectively slidable on the bat tube while the tine is engaged with the bat tube, wherein the tine is engaged with the at least one key or key way on the external surface of the bat tube, wherein the keyway or key in the band portion of the tine and the at least one key or key way on the external surface of the bat tube are configured such that the keyway or key in the band portion of the tine remains engaged with the at least one key or key way on the external surface of the bat tube when the tine is loosened and selectively slid along the at least one key or key way on the external surface of the bat tube.

11. A bat tube and tine configuration as recited in claim 10, wherein the external surface of the bat tube provides at least one key and the band portion of the tine provides at least one keyway which receives the at least one key, wherein the at least one key has a knurl thereon for digging into the band portion of the tine.

12. A bat tube and tine configuration as recited in claim 10, wherein said at least one key or keyway on the external surface of the bat tube extends along a length of the bat tube.

13. A bat tube and tine configuration as recited in claim 10, wherein the external surface of the bat tube provides a plurality of keys or keyways and the band portion of the tine provides a plurality of keyways or keys which receive the plurality of keys or keyways on the external surface of the bat tube.

14. A bat tube and tine configuration as recited in claim 13, wherein said plurality of keys or keyways extend along a length of the bat tube.

15. A bat tube and tine configuration as recited in claim 11, wherein each of said at least one key or keyway comprises a pinched portion.

16. A bat tube and tine configuration as recited in claim 13, wherein each of said plurality of keys or keyways comprises a pinched portion.

17. A bat tube and tine configuration as recited in claim 10, wherein the external surface of the bat tube provides a first key or keyway and a second key or keyway, wherein the first key or keyway is one hundred eighty degrees away from the second key or keyway on the bat tube, wherein the band portion of the tine comprises a first keyway or key configured to receive the first key or keyway, and wherein the band portion of the tine comprises a second keyway or key configured to receive the second key or keyway.

18. A bat tube and tine configuration as recited in claim 10, wherein the bat tube comprises a multiple component system comprising a plurality of profiles, wherein the plurality of profiles comprises an inner profile and an outer profile, wherein each of the profiles comprises a plurality of bat tube sections, wherein at least some of the bat tube sections which comprise the inner profile are engaged with one or more bearings, and each of the bat tube sections which comprise the outer profile is engaged with at least one bat tube section which comprises the inner profile, wherein an exterior surface of each of the bat tube sections which comprise the inner profile corresponds to an interior surface of each of the bat tube sections which comprise the outer profile, wherein the bat tube sections which comprise the inner profile are slidable into the bat tube sections which comprise the outer profile.

19. A bat tube and tine configuration as recited in claim 10, wherein the at least one key or keyway on the external surface of the bat tube engages the at least one keyway or key in the band portion of the tine and prevents the tine from rotating about the bat tube but provides that the tine is selectively slidable on the bat tube while the tine is engaged with the bat tube.

20. A harvester pick-up reel as recited in claim 1, further comprising an arm having an outer end, wherein the bat tube is journalled in the outer end of the arm.

* * * * *